United States Patent [19]

Fukuyama et al.

[11] Patent Number: 4,571,687
[45] Date of Patent: Feb. 18, 1986

[54] SCREW CUTTING CONTROL SYSTEM

[75] Inventors: Hiroomi Fukuyama, Hachioji; Shinichi Isobe, Hino, both of Japan

[73] Assignee: Fujitsu Fanuc Limited, Minamitsuru, Japan

[21] Appl. No.: 395,081

[22] PCT Filed: Oct. 16, 1981

[86] PCT No.: PCT/JP81/00288
§ 371 Date: Jun. 14, 1982
§ 102(e) Date: Jun. 14, 1982

[87] PCT Pub. No.: WO82/01336
PCT Pub. Date: Apr. 29, 1982

[30] Foreign Application Priority Data

Oct. 17, 1980 [JP] Japan ................. 55-145128

[51] Int. Cl.$^4$ ............................................. G06F 15/46
[52] U.S. Cl. ................. 364/475; 82/2 B; 82/5; 318/571; 408/11
[58] Field of Search ............... 364/474, 475, 167–171; 318/571; 408/10, 11, 13, 17, 129, 137; 82/2 B, 5; 10/129 R, 129 A, 136 E; 409/65–70

[56] References Cited

U.S. PATENT DOCUMENTS

| 3,854,837 | 12/1974 | Kreithen et al. | 408/17 |
| 4,079,235 | 3/1978 | Froyd et al. | 82/5 X |
| 4,096,770 | 6/1978 | Tanner | 82/5 X |
| 4,338,556 | 7/1982 | Hetzel | 408/13 X |
| 4,342,528 | 8/1982 | Nozu et al. | 408/11 X |

*Primary Examiner*—Joseph F. Ruggiero
*Attorney, Agent, or Firm*—Staas & Halsey

[57] ABSTRACT

The present invention increases screw cutting accuracy and simplifies the control of a screw cutting control system which performs screw cutting through the use of a numerically-controlled machine tool. A tapper (TPP) connected to a spindle, holds a tap (TAP) in a manner to be movable in the axial direction of the spindle, transmits the rotation of the spindle to the tap (TAP) for a predetermined range of forward axial movement of the tap (TAP) and transmits the rotation of the spindle to the tap (TAP) when the spindle is reversed. During screw cutting, feed by a feed motor (SZ) stops after the tap (TAP) enters a workpiece and the screw cutting is effected by the thrust of the tap itself resulting from the rotation of the spindle. The sequence of screw cutting is commanded by one block of command data.

8 Claims, 17 Drawing Figures

SCREW CUTTING CONTROL SYSTEM

BACKGROUND OF THE INVENTION

The present invention relates to a screw cutting control system which permits enhancement of screw cutting accuracy through utilization of a numerically-controlled machine tool.

In performing screw cutting using a numerically-controlled machine tool, it is customary in the prior art to carry out the following sequence with a fixed cycle. First, a tap 1 is positioned by a quick feed to a predetermined position in the X-Y plane of a workpiece 2 as shown in FIG. 1(A). Then, positioning of the tap 1 in the Z axis direction is effected by a quick feed while driving a spindle in a forward direction as shown in FIG. 1(B), after which, as shown in FIG. 1(C), the tap 1 is fed in the direction of the arrow at a feed rate dependent on the revolving speed of the spindle and the lead or pitch of the tap 1 while driving the spindle in the forward direction, thus performing screw cutting.

Upon completion of screw cutting of a predetermined quantity, i.e., depth, the rotation and feed of the spindle are stopped. However, the inertia of a spindle motor (not shown) is larger than the inertia of a feed motor (not shown) and even if stop commands are simultaneously applied, they do not stop at the same time but the spindle motor stops after the feed motor stops. Further, even after the feed is stopped, the tap 1 retains thrust if the spindle rotates and, accordingly, the tap 1 is coupled with the spindle through a tapper, or tap holder (not illustrated) for example, a tapper like those manufactured by Tapmatic Corporation. Next, as shown in FIG. 1(D), the spindle is reversed and, at the same time, the tap 1 is fed in the direction of the arrow at a feed rate dependent on the revolving speed of the spindle and the lead of the tap and when the tap 1 gets out of the workpiece 2, the tap 1 is returned by quick feed to a predetermined position as shown in FIG. 1(E).

Screw cutting by the above-described sequence has been accompanied by the following disadvantage. First, during screw cutting, the tap 1 must be fed by the feed motor. The feeding causes vibration which make it difficult to obtain a high degree of screw cutting accuracy. Second, when a stop instruction is received to stop the rotation and feed of the spindle after completion of a predetermined quantity or depth of screw cutting, the tap 1 is moved forward by the inertia force of the spindle motor to continue screw cutting even after the application of the stop instruction, therefore, it is difficult to obtain tapped holes of a designed fixed depth.

SUMMARY OF THE INVENTION

An object of the present invention is to overcome the above-described defects, improve the screw cutting accuracy and simplify control.

According to the present invention, the tap is held so as to be movable in the axial direction of the spindle. A tapper, which does not transmit the rotation of the spindle to the tap in the case where the amount of movement of the tap exceeds a predetermined range, is engaged with the spindle. During screw cutting, the feed by the feed motor is stopped prior to completion of the screw cutting and the screw cutting is completed by the trust of the tap resulting from its rotation transmitted from the spindle via the tapper. Accordingly, screw cutting accuracy can be enhanced. Moreover, since the sequence of screw cutting is commanded by one block of command data, control can be simplified.

DESCRIPTION OF THE PREFERRED EMBODIMENT

Figure 1A:
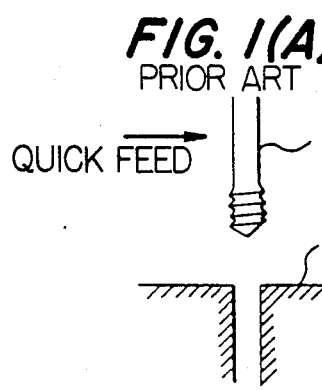
FIGS. 1(A) to 1(E) are diagrams of the sequence of conventional screw cutting.
Figure 1B:
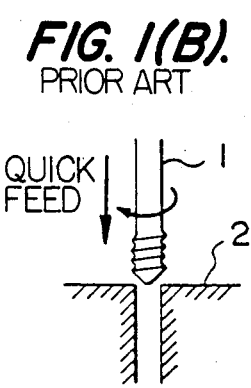
Figure 1C:
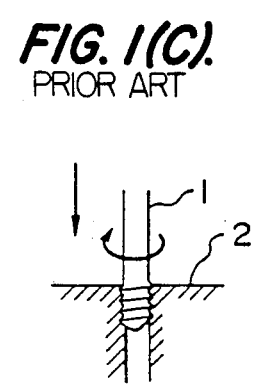
Figure 1D:
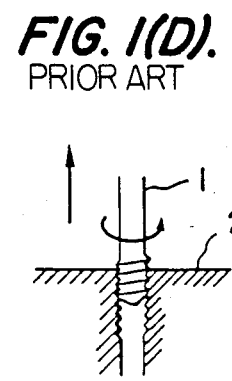
Figure 1E:
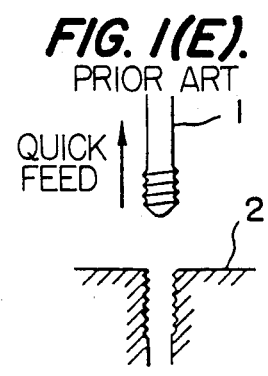
Figure 2A:
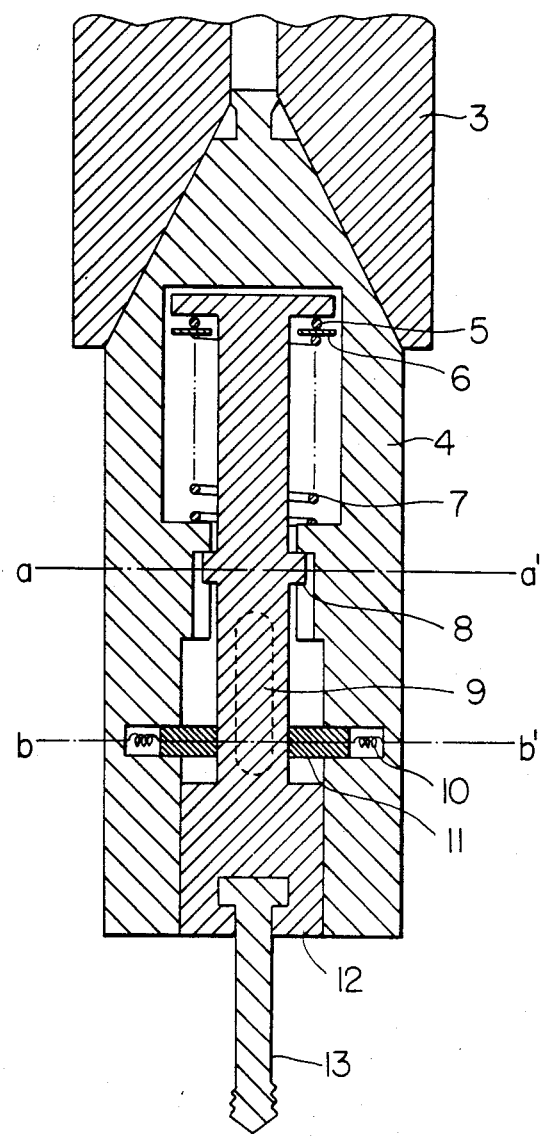
FIGS. 2(A) to 2(C) are sectional views of a tool for use in an embodiment of the present invention.
Figure 2B:
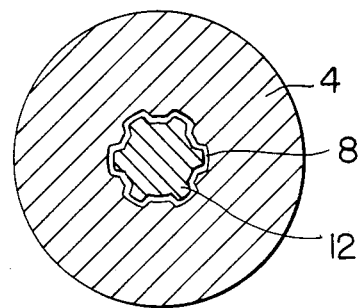
Figure 2C:
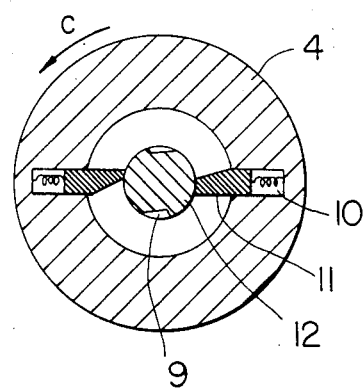

For a detailed description of the present invention, an embodiment will hereinafter be described in detail. FIGS. 2(A) to 2(C) are sectional views illustrating, by way of example, the construction of a tool for use in the embodiment of the present invention, and FIGS. 2(B) and 2(C) are sectional views taken on the lines a–a' and b–b' in FIG. 2(A), respectively. In FIGS. 2(A), 2(B) and 2(C), reference numeral 3 indicates a spindle, 4 an arbor, 5 bearings, 6 a washer, 7 a spring, 8 a spline, 9 a notch, 10 a spring, 11 pawls, 12 a holder, and 13 a tap. FIGS. 3(A) to 3(F) illustrate an example of the sequence of screw cutting using the tool shown in FIGS. 2(A) to 2(C). In this embodiment the sequence in FIGS. 3(A) to 3(F) is carried out with a fixed cycle. FIG. 4 is a sectional view showing the state of the tool during cutting, the same reference numerals indicating the same parts.

Figure 3A:
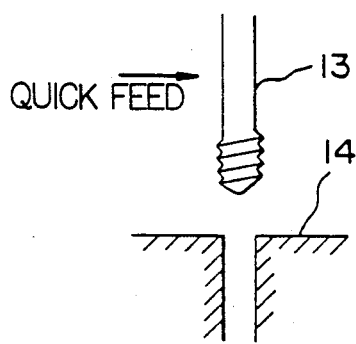
FIGS. 3(A) to 3(F) are diagrams of the sequence of screw cutting in the embodiment of the present invention.
Figure 3B:
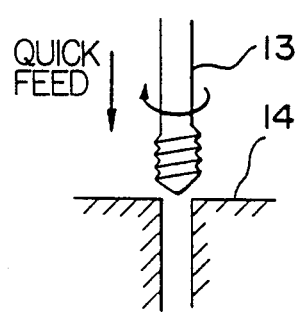
Figure 3C:
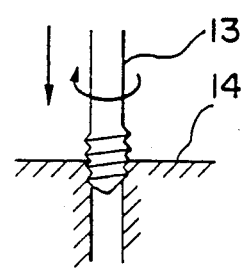

At first, the tap 13 is positioned by a quick feed to a predetermined position in the X-Y plane of a workpiece 14 as illustrated in FIG. 3(A). Next, as shown in FIG. 3(B), positioning of the tap 13 in the Z-axis direction is effected by a quick feed while driving the spindle 3 in the forward direction. In this case, the rotation of the spindle 3 is transmitted to the tap 13 via the arbor 4, the spline 8 and the holder 12. Then, as shown in FIG. 3(C), the tap 13 is fed at a feed rate dependent on the revolving speed of the spindle 3 and the lead of the tap 13 while driving the spindle 3 in the forward direction, thereby performing the screw cutting. In this case, feed by the feed motor (not shown) is stopped before completing the screw cutting, as depicted in FIG. 3(D).

Figure 3D:
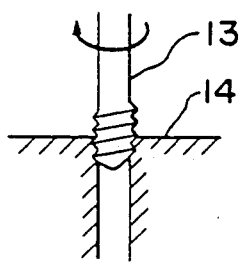
Figure 3E:
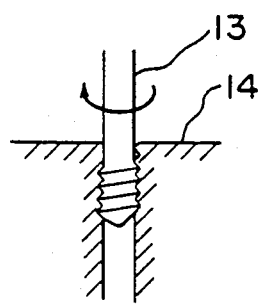
Figure 4:
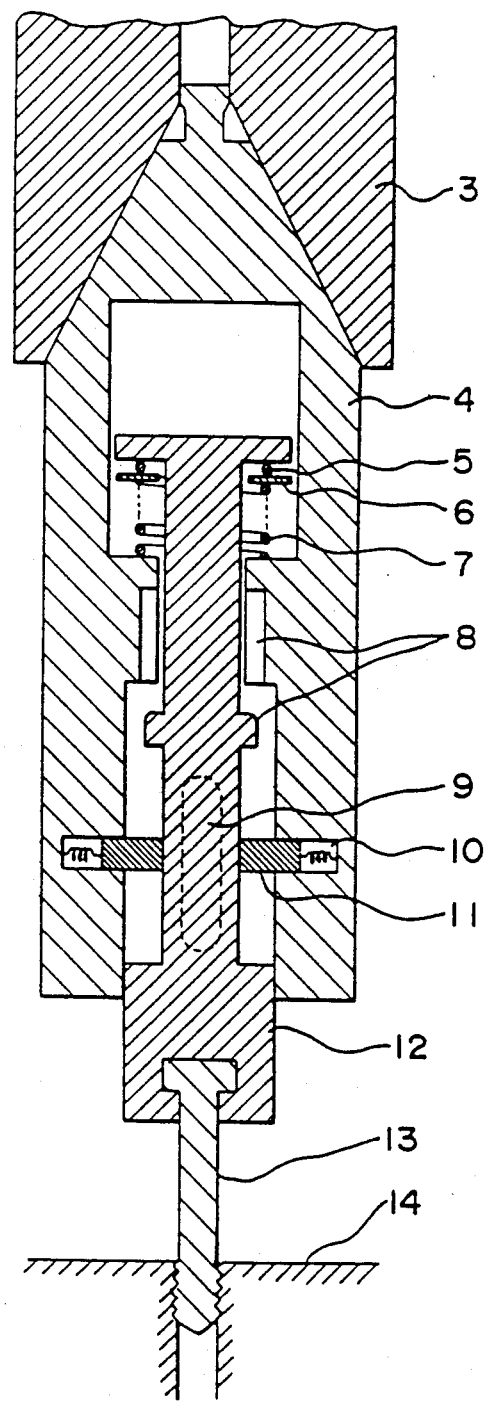
FIG. 4 is a sectional view illustrating the state of the tool during cutting.

Thereafter, the screw cutting is effected by the thrust of the tap 13 itself resulting from the rotation of the spindle 3 as shown in FIG. 3(D). When the tap 13 is moved forward by the rotation of the spindle 3, the top face of the spline 8 of the holder 12 disengages from the bottom face of the spline 8 of the arbor 4 as depicted in FIG. 4 and the rotation of the spindle 3 is no longer transmitted to the holder 12, stopping the rotation and forward movement of the tap 13. In this case, since the tap 13 stops its rotation and forward movement when it moves forward a mechanically fixed distance, that is, until the top face of the holder 12 disengages from the bottom face of the spline 8 of the arbor 4, the depth of the tapped hole can be very precise.

Figure 3F:
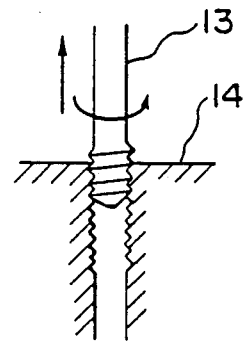

Next, the spindle 3 is reversed and, as a result, the tap 13 is fed back to a predetermined position, as shown in FIG. 3(F), at a feed rate dependent on the revolving speed of the spindle and the lead of the tap 13. When being reversed, the rotation of the spindle 3 (assuming that the spindle 3 is driven forward in the direction indicated by the arrow c in FIG. 2(C)) is transmitted to the tap 13 when the notch 9 cut in the holder 12 and the pawls 11 meshingly engage each other. Therefore, the screw is not likely to be broken when the tap 13 is pulled out from the workpiece 14.

In order to make the depth of the tapped hole accurate, it is necessary to reverse the spindle 3 after the rotation and forward movement of the tap 13 are stopped, and this can be achieved, for example, by reversing the spindle 3 a certain period of time after stopping the feed by the feed motor. Further, when the tap 13 comes out of the tapped hole, the splines 8 of the arbor 4 and the holder 12 mesh with each other at a predetermined position by the action of the spring 7.

Figure 5:
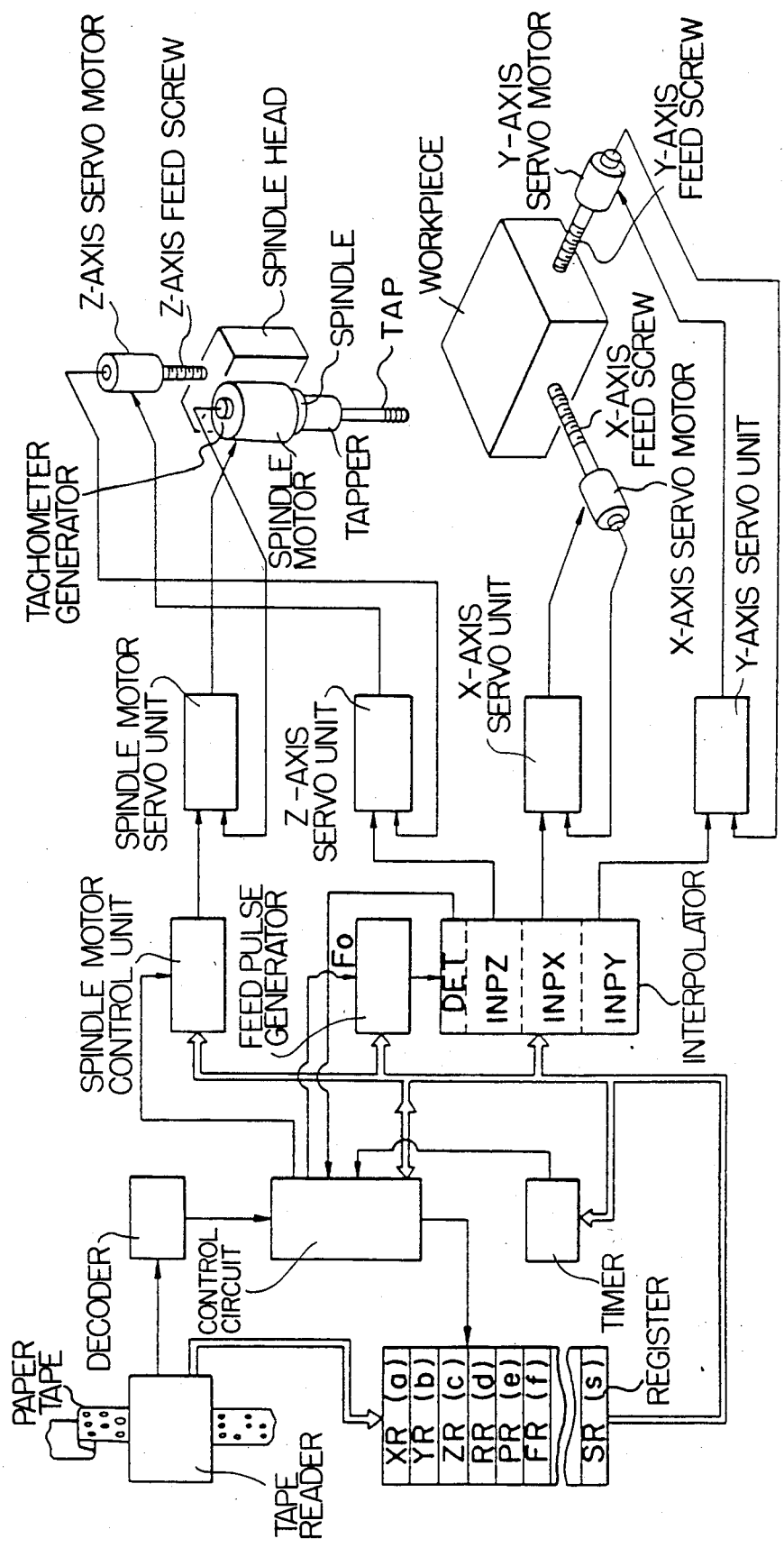
FIG. 5 is a block diagram illustrating the embodiment of the present invention.

FIG. 5 is a block diagram illustrating an example of a numerically-controlled machine tool embodying the screw cutting control system of the present invention. Reference character PT indicates a command tape, TR a tape reader, REG a register, DR a decoder, SCC a control circuit, TM a timer SCU a spindle motor control unit, FPG a feed pulse generator. Reference character INP indicates an interpolator having INPX, INPY and INPZ as X-axis, Y-axis and Z-axis units, respectively, and DET as an end detector. Reference character SS indicates a servo unit of a spindle motor SPM; SVOX, SVOY and SVOZ servo units of X-axis, Y-axis and Z-axis servomotors SX, SY and SZ, respectively, SPH a spindle head; TPP a tapper of the construction shown in FIG. 2; TAP a tap; TG a tachometer generator, and FSX; FSY and FSZ X-axis, Y-axis and Z-axis feed screws, respectively.

Command data for putting the control system of the present invention into practice are stored as command data for one block with the following format (A) on an input medium represented in FIG. 5 by the paper tape PT.

G84X-Y-Z-R-P-F- (A)

In the above format (A), G84 is an identification code indicating that the command data commanding the tap cycle according to the system of the present invention have been recorded in the form of a fixed cycle command, and       is a block end mark. Numerical data are stored which individually indicate the amount of movement along the X-axis, the amount of movement along the Y-axis, the amount of movement for cutting feed along the Z-axis, the amount of movement for quick feed along the Z-axis, the dwell time and the cutting feed rate.

Figure 6:
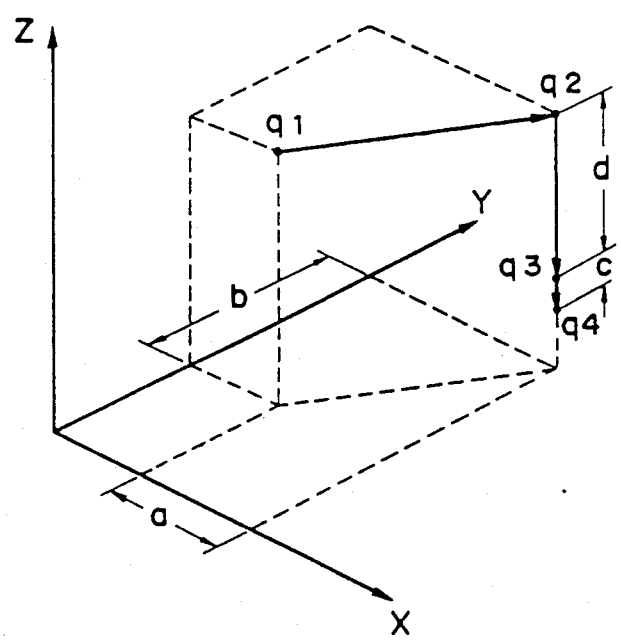
FIG. 6 is a diagram of the movement of a spindle.

In the example of moving the spindle as illustrated in FIG. 6, use is made of a command tape punched as indicated below by (B).

G84XaYbZcRdPeFf (B)

This will result in a cycle operation described below in steps (1) to (7).

(1) The spindle SPD (FIG. 5) is positioned by quick feed at a position q2 (FIG. 6) spaced a distance a in the X-axis direction and a distance b in the Y-axis direction from a current position q1 in the X-Y plane.

(2) The spindle SPD is positioned by a quick feed at a position q3 spaced a distance d in the Z-axis direction from the point q2.

(3) The spindle SPD is fed at a feed rate F to a point q4 spaced a distance c in the Z-axis direction from the point q3 for the purpose of cutting a workpiece W.

(4) The feeding is stopped for a period of dwell time e after the spindle SPD has reached the point q4. During this time, screw cutting continues due to the thrust of the tap TAP resulting from the continuing rotation of the spindle SPD.

(5) After the lapse of the above time e, the spindle motor SPM is reversed. No feeding takes place in the Z-axis direction from the start of the reversing until time e passes again.

(6) After the lapse of the time e following the start of the reversing of the spindle, the spindle SPD is moved a distance c in the negative Z-axis direction. In other words, the tap TAP comes out of the workpiece W and the spindle SPD returns to the point q3.

(7) The spindle SPD is moved by quick feed a distance d in the negative Z-axis direction and the spindle SPD has returned to the point q2.

The cutting feed rate f(mm/min) is computed by the following equation (1) using the revolving speed $S_0$ (R.P.M.) of the spindle SPD and the lead $H_0$ (mm/REV) of the tap TAP.

$$f = S_0 \times H_0 \text{ (mm/min)} \tag{1}$$

The dwell time e (sec) is computed by the following equation (2) using the length L (mm) of the screw to be cut in the workpiece W, the revolving speed $S_0$ (R.P.M.) of the spindle SPD and the lead $H_0$ (mm/REV) of the tap TAP.

$$e = 60 \times [L/(S_0 \cdot H_o)] \tag{2}$$

Next, a description will be given of the operation of the equipment shown in FIG. 5 when the aforementioned fixed cycle command data (B) are read out by the tape reader TR. When the fixed cycle command data (B) punched in the command tape TP are read by the tape reader TR, the numeric data a to f punched in the command tape PT are stored in register areas XR, YR, ZR, RR, PR and FR of the register REG respectively corresponding to them. Additionally, a revolving speed command value s of the spindle SPD from a command block preceding the fixed cycle command data (B) is stored in a register area SR.

Upon decoding the identification code G84 and the block end mark      , the decoder DR provides a signal to the control circuit SCC, by which operations mentioned below in (1)' to (7)' necessary for performing the operations referred to previously in (1) to (7) are carried out under the control of the control circuit SCC.

(1)' The content of the register area SR of the register REG, that is, the command value s of the spindle revolving speed, is applied to the spindle motor control unit SCU, and the spindle motor control unit SCU supplies the servo unit SS of the spindle motor SPM with a voltage signal proportional to the command value s to drive the spindle motor SPM. The revolving speed of the spindle motor SPM is detected by a speed sensor including the tachometer generator TG and the detection result is negatively fed back to the servo unit SS of the spindle motor SPM, driving the spindle motor SPM at a speed equal to the command value s.

The control circuit SCC reads out the numeric values a and b from the register areas XR and YR of the register REG and sets them in the X-axis and Y-axis units INPX and INPY of the interpolator INP, thereby starting pulse distribution in the interpolator INP. At this time, the feed pulse generator FPG is being supplied with a numeric value $F_0$ indicating a predetermined quick feed rate and the feed pulse generator FPG yields a pulse train corresponding to the quick feed velocity. The interpolator INP effects pulse distribution in the X- and Y-axes at the same time in synchronism with the pulse train from the feed pulse generator FPG and provides distribution pulses for the X- and Y-axes to the servo units SVOX and SVOY, respectively to rotate the servo motors SX and SY and the feed screws FSX and FSY, performing relative positioning of the tap TAP and the workpiece W in the X-Y plane by quick feed. Having yielded the distribution pulses corresponding to the command values a and b, the interpolator INP completes the pulse distributing operation and, upon detection of the end of the distribution pulse sending operation, the end detector DET supplies the control circuit SCC with information to that effect.

(2)' Next, the control circuit SCC reads out the numeric value d from the register area RR and sets it in the Z-axis unit INPZ of the interpolator INP, thereby starting pulse distributing by the interpolator INP. Also, since the feed pulse generator FPG is providing a pulse train corresponding to the quick feed rate, the spindle head SPH which is moved in the Z-axis direction by the rotation of the servomotor SZ and the feed screw FSZ is moved by quick feed along the Z-axis and, therefore, the tap TAP is also moved along the Z-axis. Having output the distribution pulses corresponding to the commanded numeric value d, the interpolator INP completes the pulse distributing operation and, upon detection of the end of the distribution pulse sending operation, the end detector DET supplies the control circuit SCC with information to that effect.

(3)' Next, the control circuit SCC reads from the register area FR the numeric value f indicating the cutting feed rate and loads it into the feed pulse generator FPG. In this way, the frequency of the pulse train applied from the feed pulse generator FPG to the interpolator INP is made to correspond to the cutting feed rate. Then, the control circuit reads the numeric value c from the register area ZR and loads it into the Z-axis INPZ of the interpolator INP, and the interpolator INP supplies the servo unit SVOZ with distribution pulses corresponding to the cutting feed rate to rotate the servo motor SZ and the feed screw FSZ, feeding the tap TAP towards the workpiece W at the cutting feed rate. Having yielded the distribution pulses corresponding to the commanded numeric value c, the interpolator INP finishes the pulse distributing operation and, upon detection of the end of the distribution pulse sending operation, the detector DET supplies the control circuit SCC with information to that effect.

(4)' Next, the control circuit SCC reads from the register area PR the numeric value e indicating the dwell time and loads the numeric value e into a counter (not shown) in the timer TM which decrements the value in the counter in accordance with reference pulses at reference time intervals. And the timer TM sends a dwell end signal to the control circuit SCC when the count value of the counter equals "0". While the timer TM is counting, the feed in the Z-axis direction is stopped, but since the spindle motor SPM rotates at the revolving speed corresponding to the commanded value s, if the tap TAP has entered the workpiece W even slightly at the end of the pulse distributing operation, screw cutting continues carried out by the thrust of the tap TAP itself.

(5)' Upon reception of the dwell end signal from the timer TM, the control circuit SCC sends a reversing command to the spindle motor control unit SCU to reverse the spindle SPD and, at the same time, reads from the register area PR the numeric value e indicating the dwell time and loads the numeric value e into the counter in the timer TM. And the timer TM sends the dwell end signal to the control circuit SCC when the count value of the counter equals "0".

(6)' Upon reception of the dwell end signal from the timer TM, the control circuit SCC reads the numeric value c from the register area ZR and receives $-c$ based on an operation by an arithmetic circuit (not shown) provided in the control circuit and loads it into the Z-axis unit INPZ of the interpolator INP. At this time, since the interpolator INP is being supplied with a pulse train of a frequency corresponding to the cutting feed rate from the feed pulse generator FPG, the interpolator INP applies to the servo unit SVOZ distribution pulses corresponding to the cutting feed rate to rotate the servomotor SZ and the feed screw FSZ, raising the spindle SPD. Having output the distribution pulses corresponding to the numeric value $-c$, the interpolator INP finishes the pulse distributing operation and, upon detection of the end of the distribution pulse sending operation, the end detector DET supplies the control circuit SCC with information to that effect.

(7)' Next, the control circuit SCC loads into the feed pulse generator FPG the numeric value $F_0$ indicating the quick feed rate and, at the same time, reads the numeric value d from the register area RR and obtains $-d$ by an arithmetic operation and loads it into the Z-axis unit INPZ of the interpolator INP. In this manner, the interpolator INP supplies the servo unit SVOZ with distribution pulses corresponding to the quick feed rate to rotate the servo motor SZ and the feed screw FSZ, raising the spindle SPD at the quick feed rate to return it to the point q2. When the end of sending the distribution pulses corresponding to the numeric value $-c$ is detected, the end detector DET informs the control circuit SCC and the control circuit SCC resets the spindle reversing command which has been provided to the spindle control unit SCU.

As has been described in the foregoing, according to the present invention, the tap is coupled with the spindle through the tapper comprising the arbor 4, the bearings 5, the washer 6, the spring 7, the spline 8, the notch 9, the spring 10, the pawls 11 and the holder 12, and during screw cutting the feed by the feed motor SZ is stopped as soon as the tap TAP has engaged the workpiece W and the screw cutting is carried out by the thrust of the tap TAP itself resulting from the rotation of the spindle SPD. Therefore, the screw cutting operation is not affected by vibration which would be caused by feeding the tap TAP using the feed motor SZ. Accordingly, the present invention has the advantage that the screw cutting can be very accurate. Further, the present invention possesses the advantage that since the tapper TPP transmits the rotation of the spindle SPD to the tap TAP only while the screw is cut by a mechanically determined amount after stopping the feed during the screw cutting operation, the depth of the screw hole can be precise. Moreover, the present invention has the advantage that since the move command in the X-Y plane, the amount of quick feed in the Z-axis direction, the amount of cutting feed in the Z-axis direction, the dwell command value and the cutting feed rate command value can be commanded with one block of command data, control is very simple.

We claim:

1. A screw cutting control system using a tap for cutting a screw in a workpiece with a numerically-controlled machine tool, comprising:
   a machine tool, comprising:
   a spindle;
   a spindle motor connected to said spindle;
   a tapper, engaged with said spindle, for holding the tap so the tap is movable in the axial direction of said spindle, coupling the tap with said spindle for a predetermined range of axial movement of the tap away from said spindle during forward rotation of said spindle, and coupling the tap with said spindle during reverse rotation of said spindle; and
   feed motors, connected to at least one of said spindle and the workpiece, for moving the workpiece and said spindle relative to each other in the axial direction of said spindle and along at least one axis independent of the axial direction of said spindle; and
   a numerical controller, operatively connected to said feed and spindle motors, for generating drive commands for said spindle motor and said feed motors, for reading one block of command data, including: an amount of movement along the at least one independent axis, an amount of movement by quick feed along the axial direction of said spindle, an amount of movement for cutting feed along the axial direction of said spindle at a cutting feed rate, a dwell command value, a cutting feed rate command value and a fixed cycle indentification code; and for sequentially performing, in accordance with the amounts of movement and the command values, control of movement along the at least one independent axis, control of movement along the axial direction of said spindle at a quick feed rate, control of movement along the axial direction of said spindle at a cutting feed rate, control for stopping the movement in the axial direction of said spindle according to the dwell command value, control for reversing the rotation of said spindle, control of movement at the cutting feed rate in a direction reverse from the direction along the axial direction of said spindle, and control of movement at the quick feed rate in a direction reverse from the direction along the axial direction of said spindle.

2. A screw cutting control system for a numerically-controlled machine tool using a tap to cut a screw in a workpiece, comprising:
   a numerical controller for generating drive commands;
   a machine tool, operatively connected to said numerical controller, comprising:
   a spindle;
   a spindle motor, connected to said spindle and operatively connected to said numerical controller, for rotating said spindle in forward and reverse directions; and
   a tapper, engageable with said spindle, for holding the tap while permitting axial movement between the tap and said spindle, transmitting the forward rotation of said spindle to the tap only within a predetermined range of axial movement of the tap away from said spindle and transmitting the reverse rotation of said spindle to the tap; and
   feed motors, operatively connected to said numerical controller and connected to at least one of the workpiece and said spindle, for moving said spindle and the workpiece relative to each other along the axis of said spindle and along an axis independent of the axis of said spindle.

3. A screw cutting control system as recited in claim 2, wherein said tapper comprises:
   an arbor, engageable with said spindle, having a cylindrical cavity with an orifice opposite said spindle, the cylindrical cavity having walls of varying diameter including a splined section; and
   a holder for the tap, located in the cylindrical cavity of said arbor and movable along the axis of the cylindrical cavity, and engageable with the splined section of the cylindrical cavity for a fixed amount of axial movement.

4. A screw cutting control system as recited in claim 2, wherein said tapper comprises:
   an arbor, engageable with said spindle, having a cylindrical cavity, opening on the end of said arbor opposite said spindle, with an upper chamber, a middle chamber narrower than the upper chamber and having splined walls, and a lower chamber with walls at least as wide as the widest portion of the middle chamber;
   a holder, located inside said arbor, having an upper shaft portion with a diameter smaller than the diameter of the upper chamber of said arbor and larger than the diameter of the middle chamber of said arbor, a middle shaft portion having a narrow diameter area with a diameter narrower than the narrowest diameter of the middle chamber of said arbor and having a wider diameter splined area with splines engageable with the splined walls of the middle chamber of said arbor and including diametrically opposing notches located in the middle shaft portion below the splined area, and a lower shaft portion having a diameter approximately equal to the diameter of the lower chamber of said arbor and for holding the tap;
   a washer located in the upper chamber of said arbor;
   a spring located in the upper chamber of said arbor between said washer and the middle chamber of said arbor;
   bearings located in the upper chamber of said arbor between said washer and the lower surface of the upper portion of said holder; and
   pawls, located diametrically opposite each other in the lower chamber of said arbor, for engaging the notches of said holder when said spindle rotates in the reverse direction.

5. A screw cutting control system as recited in claim 2, wherein said numerical controller comprises:
   command data input means, operatively connected to receive command data, for inputting command data;
   a command data register, operatively connected to said command data input means, for storing command data comprising a dwell period defining a time between commands; and
   command transmitting means, operatively connected to said feed and spindle motors, said command data register and said command data input means, for transmitting commands to said feed and spindle motors.

6. A screw cutting control system as recited in claim 5, wherein said command data register comprises;
   an independent axis positioning register area;
   an axial direction positioning register area;
   an axial direction cutting feed register area;
   a dwell period register area; and
   a cutting feed rate register area.

7. A screw cutting control system as recited in claim 6, wherein said command data input means inputs one block of data at a time, the block of data comprising an identifying code and command data corresponding to the register areas in said command register including a dwell period.

8. A screw cutting control system as recited in claim 6, wherein said command transmitting means comprises:
   a decoder operatively connected to said command data input means;
   a control circuit operatively connected to said command data register and said decoder;
   a dwell timer, operatively connected to said command data register and said control circuit, for timing the dwell period based on the content of said dwell period register area;
   a spindle motor control unit operatively connected to said command data register and said control circuit;
   a spindle motor servo unit operatively connected to said spindle motor and said spindle motor control unit;
   a feed pulse generator, operatively connected to said command data register and said control circuit, for generating feed pulses using a quick feed rate supplied by said control circuit and a cutting feed rate based on the content of said cutting feed rate register area;
   an interpolator operatively connected to said command data register, said control circuit and said feed pulse generator;
   an axial direction feed servo unit operatively connected to one of said feed motors and said interpolator; and
   an independent axis feed servo unit operatively connected to another of said feed motors and said interpolator.

* * * * *

UNITED STATES PATENT AND TRADEMARK OFFICE
CERTIFICATE OF CORRECTION

PATENT NO. : 4,571,687

DATED : February 18, 1986

INVENTOR(S) : Fukuyama et al.

It is certified that error appears in the above-identified patent and that said Letters Patent is hereby corrected as shown below:

Column 1, line 66, "trust" should be --thrust--.
Column 3, line 23, "unit," should be --unit and--;
 line 41, "F-" should be --F-*--;
 line 47, "and is" should be --and * is--;
 line 58, after "Ff" insert --*--;
 line 63 "a" (second occurrence) should be --a--.

Column 4, line 1, "F" should be --f--;
 line 41, "a" should be --a--;
 line 49, "," should be --*,--;
 line 67, "a" should be --a--.

Column 5, line 16, "a" should be --a--.

Signed and Sealed this

Tenth Day of June 1986

[SEAL]

Attest:

DONALD J. QUIGG

Attesting Officer

Commissioner of Patents and Trademarks